(12) United States Patent
Ocken et al.

(10) Patent No.: US 12,214,303 B2
(45) Date of Patent: Feb. 4, 2025

(54) AIRFOIL LAST CHANCE SCREEN UTILIZING EDM AND AFM

(71) Applicant: Collins Engine Nozzles, Inc., Des Moines, IA (US)

(72) Inventors: Thomas J. Ocken, Des Moines, IA (US); Murtuza Lokhandwalla, South Windsor, CT (US); Mark J. Kelly, Longmeadow, MA (US); Andrew M. Caldecutt, Vernon, CT (US); Jerry Logsdon, Van Meter, IA (US); Nathan DeVore, Winterset, IA (US); Joseph Samo, Johnston, IA (US)

(73) Assignee: Collins Engine Nozzles, Inc., Des Moines, IA (US)

( * ) Notice: Subject to any disclaimer, the term of this patent is extended or adjusted under 35 U.S.C. 154(b) by 300 days.

(21) Appl. No.: 17/990,343

(22) Filed: Nov. 18, 2022

(65) Prior Publication Data

US 2024/0167423 A1    May 23, 2024

(51) Int. Cl.
*B01D 29/00* (2006.01)
*B01D 39/10* (2006.01)
(Continued)

(52) U.S. Cl.
CPC ......... *B01D 29/0093* (2013.01); *B01D 39/10* (2013.01); *B23H 7/08* (2013.01); *B23H 9/14* (2013.01); *B01D 2201/184* (2013.01); *B23H 7/02* (2013.01); *B24C 1/083* (2013.01); *F05D 2230/12* (2013.01); *F05D 2260/607* (2013.01)

(58) Field of Classification Search
CPC ........ B01D 29/0093; B01D 2239/0478; B01D 2239/1216
See application file for complete search history.

(56) References Cited

U.S. PATENT DOCUMENTS 7,262,382 B2    8/2007  Beaumont et al.
10,112,725 B2   10/2018 Fausett et al.
(Continued)

FOREIGN PATENT DOCUMENTS

KR         102268275 B1    6/2021

OTHER PUBLICATIONS

M. Kunieda, et al., "Reverse Simulation of Die-Sinking EDM", from Annals of the CIRP vol. 48/1, 1999, pp. 115-118.
(Continued)

*Primary Examiner* — Jason L Vaughan
*Assistant Examiner* — Amanda Kreiling
(74) *Attorney, Agent, or Firm* — Kinney & Lange, P.A.

(57) ABSTRACT

A method of manufacturing a last chance screen for an aircraft engine includes forming an array of holes through a metal sheet with a wire electrode using electrical discharge machining. The array of holes comprises a plurality of holes. Each hole of the plurality of holes comprises a first end and a second end and is surrounded by a wall section such that the last chance screen is defined by the plurality of holes and the plurality of wall sections. The first and second end of each hole are widened by either applying a flow of an abrasive flow medium to the array of holes in two directions or using a conical sinker electrode on either side of the metal sheet. Shaping the first and second end of each hole results in an airfoil-shaped cross-section of each wall section.

20 Claims, 7 Drawing Sheets

(51) Int. Cl.
*B23H 7/02* (2006.01)
*B23H 7/08* (2006.01)
*B23H 9/14* (2006.01)
*B24C 1/08* (2006.01)

(56) References Cited

U.S. PATENT DOCUMENTS

| | | |
|---|---|---|
| 10,495,002 B2 | 12/2019 | Cordatos et al. |
| 2012/0292527 A1* | 11/2012 | Fomenkov ............. B01D 29/56 250/428 |
| 2018/0016986 A1* | 1/2018 | Cordatos ............. B01D 35/005 |
| 2018/0078881 A1 | 3/2018 | Suzuki et al. |

OTHER PUBLICATIONS

Extended European Search Report for EP Application No. 23210267.3, dated Apr. 26, 2024, 14 pages.

H. T. Liu, "Hole Drilling with Abrasive Fluidjets", from Int J. Adv. Manuf. Technol., pp. 942-957, (2007).

Jiang, Hua, et al., "Effects of Flow Passage Expansion or Contraction on Jet-Fuel Surface Deposition", Journal of Propulsion and Power, vol. 28, No. 4, Jul.-Aug. 2012, 694-706.

\* cited by examiner

AIRFOIL LAST CHANCE SCREEN UTILIZING EDM AND AFM

BACKGROUND

The present application relates generally to aircraft fuel systems and in particular to methods of manufacturing last chance screens for aircraft fuel systems.

Fuel systems are included in aircraft to provide fuel to combustors of gas turbine aircraft engines, and can include fuel tanks and fuel processing systems that are configured to condition and meter the fuel flow to the combustor of the aircraft engines. A last chance screen can be positioned in a fuel conduit extending from the fuel tank and fuel processing system to the aircraft engine. Last chance screens are designed to filter particles out of fuel to prevent particles from flowing into the aircraft engine and clogging components in the aircraft engine such as fuel nozzles configured to spray the fuel into the combustor. The fuel flows through openings in the screen that are sized to filter particles out of the fuel. However, conventional last chance screens formed of woven wire mesh are highly susceptible to coking, where insoluble deposits accumulate on the surfaces of the last chance screens and cause clogging of the last chance screen. Clogging of this kind creates or increases a pressure drop across the last chance screens, which can impact the efficiency of the aircraft engine positioned downstream of the last chance screen. Further, the deposits that accumulate on the surface of the last chance screens can shear or break off and be carried downstream into the aircraft engine, causing clogging of engine components such as the fuel nozzles. As the temperature of fuel flowing through a last chance screen increases, the last chance screen becomes more susceptible to coking.

Last chance screens with holes having a wider end than a central point (resulting in the wall sections separating the holes having an airfoil-shaped cross-section) outperform conventional woven mesh screens by reducing the surfaces that are normal to the fuel flow through the screen. This reduction in flow-orthogonal surface area helps to reduce coking on the last chance screen. However, the tapered shape of such wall sections is difficult to achieve using traditional screen making techniques, such as stamping or electrical discharge machining hole drilling processes.

SUMMARY

According to one aspect of the present invention, a method of manufacturing a last chance screen for an aircraft engine includes forming an array of holes through a metal sheet with a wire electrode using electrical discharge machining. The array of holes comprises a plurality of holes. Each hole of the plurality of holes extends from a first end to a second end. Each hole is surrounded by a wall section such that the last chance screen is defined by the plurality of holes and the plurality of wall sections. The first end of each hole is shaped by applying a flow of an abrasive flow medium to the array of holes in a first direction, such that the first end of each hole is widened by the flow of the abrasive flow medium and a portion of the wall section adjacent to the first end of each hole has a first convex curvature with respect to the hole. The second end of each hole is shaped by applying a flow of the abrasive flow medium to the array of holes in a second direction which is opposite to the first direction, such that the second end of each hole is widened by the flow of the abrasive flow medium and a portion of the wall section adjacent to the second end of each hole has a second convex curvature with respect to the hole. Shaping the first end of each hole and shaping the second end of each hole results in an airfoil-shaped cross-section of each wall section.

According to another aspect of the present invention, a method of manufacturing a last chance screen for an aircraft engine includes forming an array of holes through a metal sheet with a wire electrode using electrical discharge machining. The array of holes comprises a plurality of holes. Each hole of the plurality of holes extends from a first end to a second end. Each hole is surrounded by a wall section such that the last chance screen is defined by the plurality of holes and the plurality of wall sections. The first end of each hole is shaped with a first conical sinker electrode using electrical discharge machining, such that the first end of each hole is widened by the electrical discharge machining and a portion of the wall section adjacent to the first end of each hole has a first convex curvature with respect to the hole. The second end of each hole is shaped with a second conical sinker electrode using electrical discharge machining, such that the second end of each hole is widened by the electrical discharge machining and a portion of the wall section adjacent to the second end of each hole has a second convex curvature with respect to the hole. Shaping the first end of each hole and shaping the second end of each hole results in an airfoil-shaped cross-section of each wall section.

The present summary is provided only by way of example, and not limitation. Other aspects of the present disclosure will be appreciated in view of the entirety of the present disclosure, including the entire text, claims, and accompanying figures.

Figure 1:
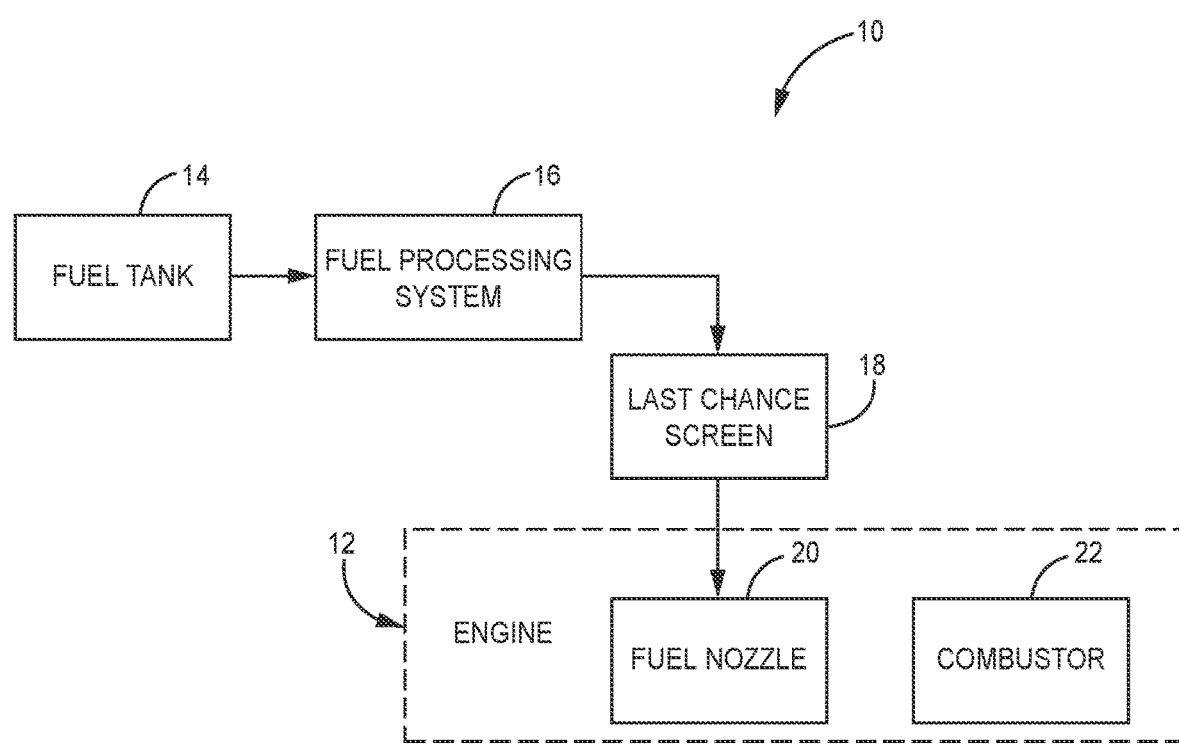
FIG. 1 is a schematic depiction of a fuel system for an aircraft engine.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

A last chance screen having tapered holes surrounded by airfoil-shaped wall sections can reduce deposits on the screen by reducing the number of surfaces that are normal to the fuel flow. Electrical discharge machining (EDM) can be used to partially or fully shape these airfoil-shaped wall sections within the screen. Abrasive flow machining (AFM) can be combined with EDM processes to further shape the airfoil-shaped wall sections.

FIG. 1 is a schematic depiction of fuel system 10 for aircraft engine 12. FIG. 1 shows fuel system 10 and aircraft engine 12. Fuel system 10 includes fuel tank 14, fuel processing system 16, and last chance screen 18. Aircraft engine 12 includes fuel nozzle 20 and combustor 22.

Fuel system 10 is configured to store, condition, and deliver fuel to aircraft engine 12. Fuel system 10 includes fuel tank 14 that stores fuel for use in aircraft engine 12. Fuel tank 14 can be positioned in any suitable location on an aircraft. Fuel tank 14 is fluidly coupled to fuel processing system 16 using a fuel conduit. Fuel flows from fuel tank 14 to fuel processing system 16, which is configured to condition and meter the fuel flow. Conditioning the fuel can include adjusting the pressure and temperature of the fuel and filtering the fuel. Last chance screen 18 is positioned in a fuel conduit extending between fuel processing system 16 and aircraft engine 12 and is fluidly coupled to fuel tank 14 and fuel processing system 16 that are upstream of last chance screen 18. Last chance screen 18 is designed to filter a fuel flow immediately before the fuel flow enters aircraft engine 12, and can thereby remove particles from the fuel to prevent these particles from flowing into aircraft engine 12 and clogging components within aircraft engine 12, such as fuel nozzle(s) 20. The location of last chance screen 18 within fuel system 10 allows last chance screen 18 to filter out particles that are introduced into the fuel flow during operation of fuel system 10, such as debris from machining processes or wear.

Aircraft engine 12 includes fuel nozzle 20 and combustor 22. Fuel nozzle 20 and combustor 22 are fluidly coupled to fuel system 10, including fuel tank 14, fuel processing system 16, and last chance screen 18. Fuel flows from fuel processing system 16 through last chance screen 18 to fuel nozzle 20, which sprays the fuel into combustor 22 for use by aircraft engine 12. One last chance screen 18 and one fuel nozzle 20 are shown in FIG. 1, but any suitable number of last chance screens 18 and fuel nozzles 20 can be included in alternate embodiments. At least one last chance screen 18 will be positioned in each fuel conduit leading to one fuel nozzle 20. In alternate embodiments, two or more last chance screens 18 can be positioned in each fuel conduit leading to one fuel nozzle 20. Further, last chance screens can be positioned between fuel tank 14 and fuel processing system 16 in some embodiments.

Fuel nozzle 20 has small and intricate passages and orifices that are designed to obtain the desired degree of fuel distribution and atomization in combustor 22. Debris and contaminant particles can be generated in fuel system 10. Last chance screen 18 is designed to filter the debris and contaminant particles out of the fuel prior to the fuel being delivered to fuel nozzle 20. This will prevent the debris and contaminant particles from clogging the passages and orifices of fuel nozzle 20.

Figure 2A:
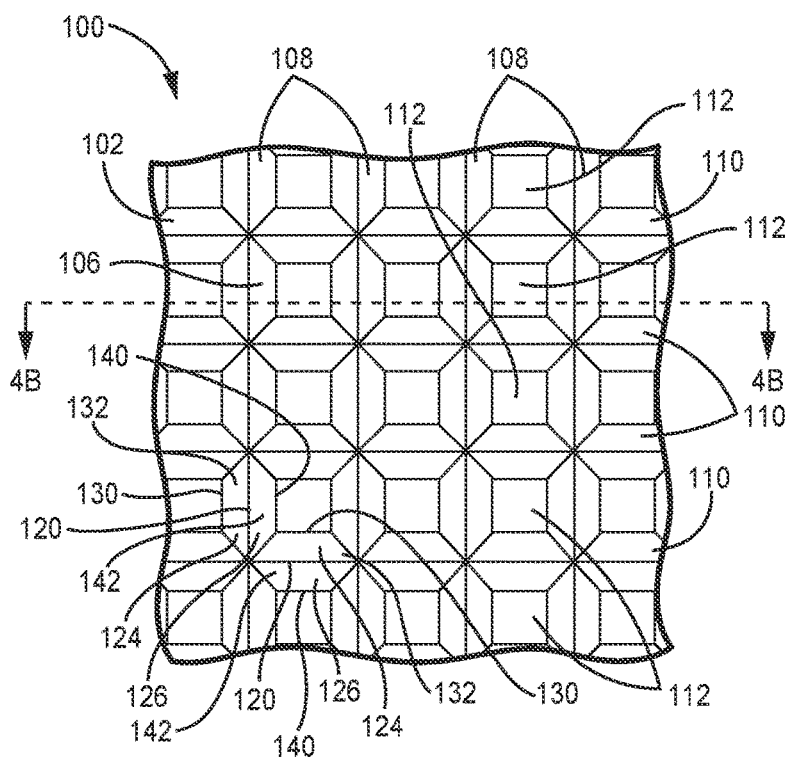
FIG. 2A is a top plan view of a last chance screen.
Figure 2B:
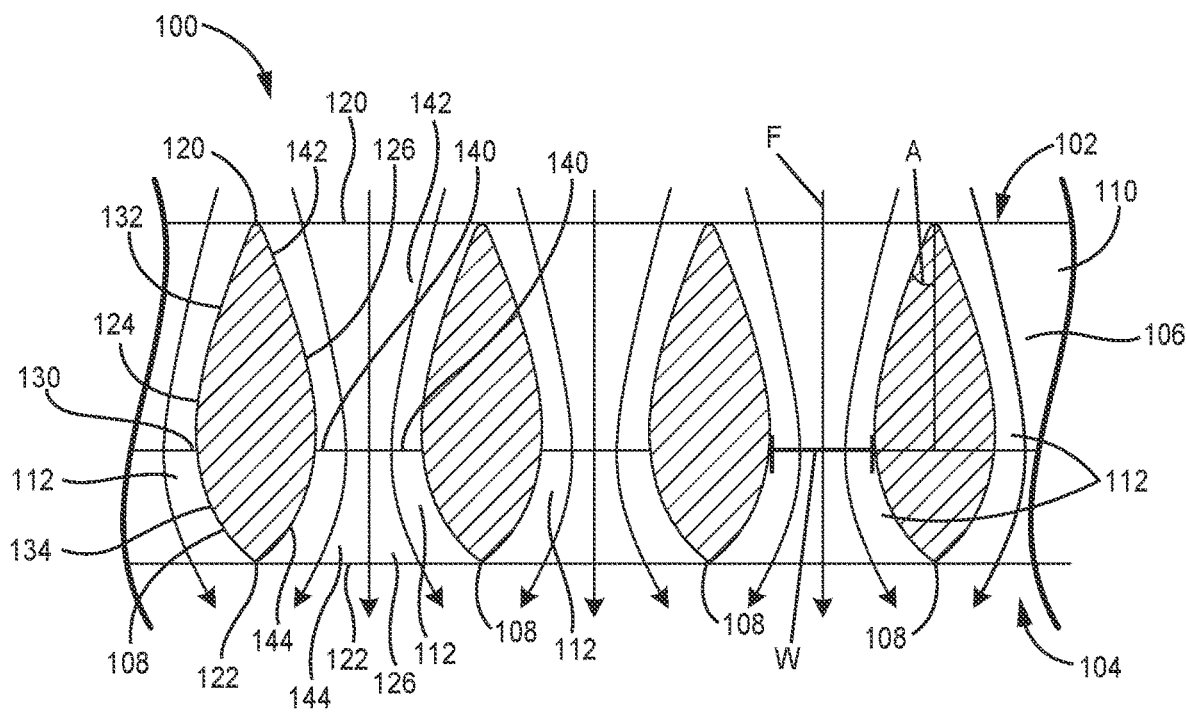
FIG. 2B is a cross-sectional side view of airfoil-shaped wall sections within the last chance screen of FIG. 2A.

FIG. 2A is a top plan view of last chance screen 100. FIG. 2B is a cross-sectional view of last chance screen 100 taken along line 2B-2B of FIG. 2A. Last chance screen 100 includes upstream end 102, downstream end 104 (shown in FIG. 2B), and mesh 106, which includes first members 108, second members 110, and openings 112. Each member of first members 108 and second members 110 have leading edge 120, trailing edge 122 (shown in FIG. 2B), first side 124, and second side 126. First side 124 includes first outermost edge 130, first leading contoured surface 132, and first trailing contoured surface 134. Second side 126 includes second outermost edge 140, second leading contoured surface 142, and second trailing contoured surface 144. FIG. 2B shows flow arrows F and width W.

Last chance screen 100 is a last chance screen according to the present disclosure that can be used in fuel system 10 (shown in FIG. 1). Last chance screen 100 has upstream end 102 and downstream end 104 opposite of upstream end 102. Last chance screen 100 is configured to be positioned in a fuel conduit between fuel processing system 16 and fuel nozzle 20 (both shown in FIG. 1). In some examples, last chance screen 100 has a diameter of approximately 0.250 inches. Upstream end 102 is configured to face fuel processing system 16, and downstream end 104 is configured to face fuel nozzle 20. Last chance screen 100 is configured to be positioned in the fuel conduit to filter the fuel flowing from fuel process system 22 to fuel nozzle 20. Fuel will flow through upstream end 102 and then out of downstream end 104 of last chance screen 100.

Last chance screen 10 includes mesh 106 having first members 108 running in a first direction and second members 110 running in a second direction and intersecting first members 108. In the embodiment shown in FIGS. 2A-2B, the second direction is perpendicular to the first direction. First members 108 and second members 110 intersect one another to form mesh 106, as shown in FIG. 2A. First members 108 and second members 110 have airfoil-shaped cross-sections. Openings 112 are formed in mesh 106 between first members 108 and second members 110. As shown in FIGS. 2A-2B, openings 112 are square shaped. In alternate embodiments, openings 112 can be circular, rectangular, elliptical, or any other suitable shape. In some examples, mesh 106 within last chance screen 100 can have a diameter of approximately 0.18 inches.

As shown in FIG. 2B, first members 108 and second members 110 have airfoil-shaped cross-sections. Each member of first members 108 and second members 110 have leading edge 120 at upstream end 102 of last chance screen 100 and trailing edge 122 at downstream end 104 of last chance screen 100. First side 124 extends from leading edge 120 to trailing edge 122, and second side 126 is opposite of first side 124 and extends from leading edge 120 to trailing edge 122. First side 124 has first outermost edge 130 between leading edge 120 and trailing edge 122 that is the outermost edge of first side 124 of second member 110. First leading contoured surface 132 extends between leading edge 120 and first outermost edge 130 on first side 124, and first trailing contoured surface 134 extends between first outermost edge 130 and trailing edge 122 on first side 124. First outermost edge 130 is positioned downstream of a central axis of each member of first members 108 and second members 110. First leading contoured surface 132 has a greater length than first trailing contoured surface 134 in the embodiment shown in FIGS. 2A-2B. In alternate embodiments, first leading contoured surface 132 and first trailing contoured surface 134 can be the same length or first trailing contoured surface 134 can have a greater length than first leading contoured surface 132. Second side 126 has second outermost edge 140 between leading edge 120 and trailing edge 122 that is the outermost edge of second side 126 of second member 110. Second leading contoured surface 142 extends between leading edge 120 and second outermost edge 140 on second side 126, and second trailing contoured surface 144 extends between second outermost edge 140 and trailing edge 122 on second side 126. Second outermost edge 140 is positioned downstream of a central axis of each member of first members 108 and second members 110. Second leading contoured surface 142 has a greater length than second trailing contoured surface 144 in the embodiment shown in FIGS. 2A-2B. In alternate embodiments, second leading contoured surface 142 and second trailing contoured surface 144 can be the same length or second trailing contoured surface 144 can have a greater length than second leading contoured surface 142.

The airfoil-shaped cross-section of first members 108 and second members 110 is a biconvex shaped cross-section. Leading edge 120 forms an upstream tip of the airfoil-shaped cross-section, and trailing edge 122 forms a downstream tip of the airfoil-shaped cross-section. First side 124 and second side 126 both bulge outwards to form convex shaped sides of the airfoil-shaped cross-section.

The airfoil-shaped cross-section of first members 108 and second members 110 creates converging nozzles and diverging nozzles on last chance screen 100. Each opening 112 of mesh 106 of last chance screen 100 is surrounded by two first members 108 and two second members 110. First side 124 of one first member 108, second side 126 of an adjacent first member 108, first side 124 of one second member 110, and second side 126 of an adjacent second member 110 surround each opening 112 in mesh 106 of last chance screen 100. First leading contoured surface 132 of the one first member 108, second leading contoured surface 142 of the adjacent first member 108, first leading contoured surface 132 of the one second member 110, and second leading contoured surface 142 of the adjacent second member 110 form a converging nozzle leading to the narrowest portion of opening 112. First trailing contoured surface 134 of the one first member 108, second trailing contoured surface 144 of the adjacent first member 108, first trailing contoured surface 134 of the one second member 110, and second trailing contoured surface 144 of the adjacent second member 110 form a diverging nozzle leading to the downstream end of opening 112. The converging nozzles formed by first leading contoured surfaces 132 and second leading contoured surfaces 142, and the diverging nozzles formed by first trailing contoured surfaces 134 and second trailing contoured surfaces 144 promote the streamlined flow of fuel from upstream side 102 to downstream side 104 of last chance screen 100.

FIG. 2B shows fuel flowing through openings 112 with flow arrows F. The fuel that is flowing straight towards opening 112, represented by the center flow arrow F, will flow straight through opening 112. The fuel that is flowing towards first members 108 curves inwards around first members 108 to flow through opening 112. First leading contoured surfaces 132 on first sides 124 and second leading contoured surfaces 142 on second sides 126 of first members 108 and second members 110 direct the flow of the fuel through opening 112. First trailing contoured surfaces 134 on first sides 124 and second trailing contoured surfaces 144 on second sides 126 direct the flow of fuel outwards as fuel exits last chance screen 100 at downstream end of last chance screen 100.

The airfoil-shaped cross-sections of first members 108 and second members 110 reduces the number of surfaces that are normal to the flow of the fuel compared to prior art last chance screen 50 shown in FIGS. 2A-3B. Rather, first leading contoured surfaces 132 and second leading contoured surfaces 142 are tangential to the flow of fuel through last chance screen 100. This allows the upstream portions of first sides 124 and second sides 126 of first members 108 and second members 110 to be tangential to the flow of the fuel. This prevents recirculation zones from forming at the upstream surfaces and/or downstream surfaces of first members 108 and second members 110. The contour of first leading contoured surfaces 132 and second leading contoured surfaces 142 can be designed to direct the flow of fuel through openings 112 through last chance screen 100. Further, the contour of first trailing contoured surfaces 134 and second trailing contoured surfaces 136 can be designed to direct the flow of fuel from openings 112 outward into the fuel conduit on downstream end 104 of last chance screen 100.

Width W is shown in FIG. 2B. Width W is the width between first outermost edge 130 of a first member and second outermost edge 132 of an adjacent member. In a first embodiment, width W is about 0.00394 inches (0.1 millimeter). In alternate embodiments, width W can have any width that is suitable for filtering particles out of the fuel flowing through last chance screen 100. Specifically, width W can be selected based on the size of the particles needing filtering out of the fuel and/or the size of the passages and orifices on components downstream of last chance screen 100.

Half-cone angle A is shown in FIG. 2B. Half-cone angle A is the angle formed between an end of a member (such as a first member 108 or second member 110) and a widest point of the member. The widest point of each member is adjacent to a narrowest point of the opening between the member and an adjacent member (located at width W in FIG. 2B). Half-cone angle A can be between approximately 1 degree and approximately 30 degrees. In the example depicted in FIG. 2B, half-cone angle A is approximately 5 degrees.

As described below in reference to FIGS. 3-6D, last chance screen 100 can be formed with a machining process, such as an electrical discharge machining process (which can be supplemented with an abrasive flow machining process). Last chance screen 100 is manufactured to form a monolithic unibody including first members 108 and second members 110. Last chance screen 100 can be made out of nickel-based alloys, nickel-chromium-based superalloys, aluminum-based alloys, steel, high strength plastic, nylon, or any other suitable material. Last chance screen 100 can be coated with polytetrafluoroethylene (PTFE). The polytetrafluoroethylene (PTFE) coating is configured to prevent deposits from accumulating on the surface of last chance screen 100.

The airfoil-shaped cross-section of first members 108 and second members 110 reduces or eliminates coking of last chance screen 100. The airfoil-shaped cross-section of first members 108 and second members 110 prevent stagnant recirculation zones from forming on upstream end 102 and downstream end 104 of last chance screen 100 to help prevent deposits from settling on last chance screen 100. Eliminating stagnant recirculation zones from forming on upstream end 102 and downstream end 104 of last chance screen 100 enables fuel at hotter temperatures, for examples temperatures of greater than 300 degrees Fahrenheit (149 degrees Celsius), to flow through last chance screen 100 without coking of last chance screen 100. This allows fuel processing system 16 of fuel system 10 (shown in FIG. 1) to increase the temperature of the fuel prior to delivering it to fuel nozzles 20 of aircraft engine 12 (shown in FIG. 1). This will improve the overall efficiency of aircraft engine 12, as less energy is needed to combust the fuel in combustor 22 (shown in FIG. 1).

Preventing coking of last chance screen 100 allows fuel to flow through last chance screen 100 reduces the pressure drop across last chance screen 100. Reducing the pressure drop across last chance screen 100 reduces the work that fuel pumps in fuel system 10 have to do. Further, preventing coking of last chance screen 100 will extend the life of last chance screen 100, as deposits will not form on and clog last chance screen 100.

Figure 3:
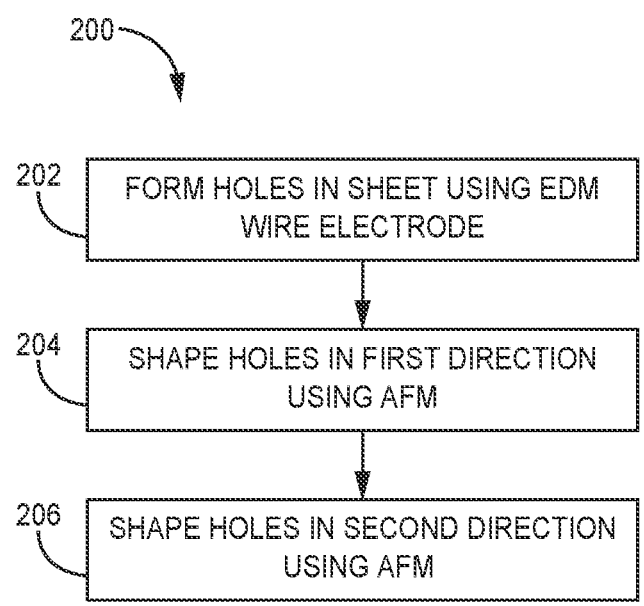
FIG. 3 depicts a method of creating airfoil-shaped wall sections in a last chance screen.
Figure 4A:
FIG. 4A is a cross-sectional side view of a metal sheet.
Figure 4B:
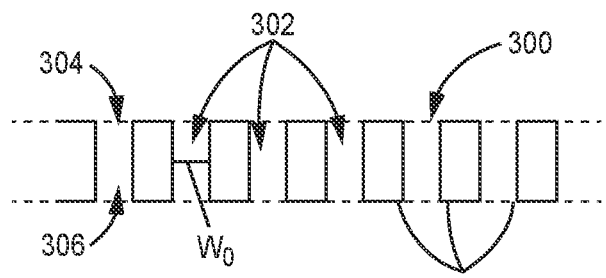
FIG. 4B is a cross-sectional side view of the metal sheet of FIG. 4A after holes have been formed in the sheet by a wire electrode using EDM.
Figure 4C:
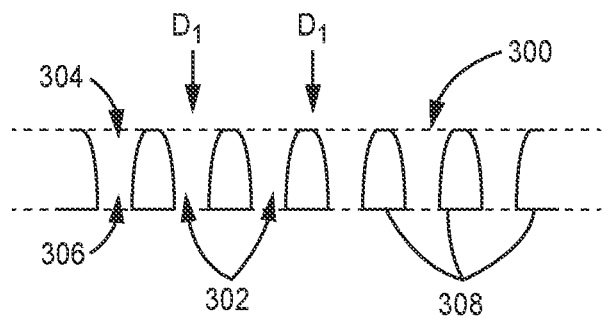
FIG. 4C is a cross-sectional side view of the metal sheet of FIG. 4B after the holes have been shaped by AFM in a first direction.
Figure 4D:
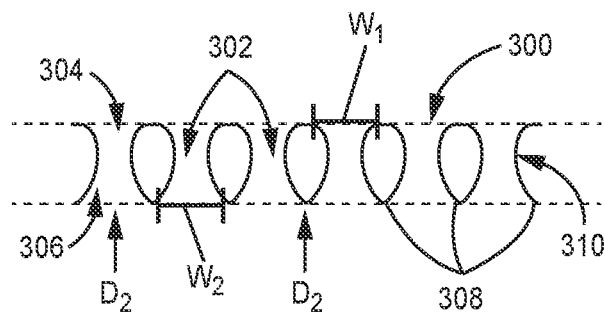
FIG. 4D is a cross-sectional side view of the metal sheet of FIG. 4C after the holes have been shaped by AFM in a second direction which is opposite to the first direction.

FIG. 3 depicts method 200 of creating holes (such as holes 302 shown in FIGS. 4B-4D) in a last chance screen. Method 200 includes steps 202-206. FIG. 4A is a cross-sectional side view of metal sheet 300. FIG. 4B is a cross-sectional side view of metal sheet 300 after holes 302 have been formed in metal sheet 300 with a wire electrode using EDM. Each hole 302 extends from first end 304 to second end 306 and is surrounded by wall sections 308. FIG. 4C is a cross-sectional side view of metal sheet 300 after holes 302 have been shaped by AFM in first direction $D_1$. FIG. 4D is a cross-sectional side view of metal sheet 300 after holes 302 have been shaped by AFM in a second direction D2. FIG. 3 will be discussed with each of FIGS. 4A-4D in turn below.

FIG. 4A is a cross-sectional side view, pre-machining, of metal sheet 300. Metal sheet 300 can have a uniform thickness of approximately 1/32 inch (0.03125 inches or approximately 0.794 millimeters) and can be a metal alloy such as grade 304 stainless steel, grade 316L stainless steel, an Inconel® alloy, or another suitable material.

In step 202, holes 302 are formed in metal sheet 300 as shown in FIG. 4B. A wire electrode can be used to form uniform through-holes in metal sheet 300 in a selected pattern. For example, holes 302 can be arranged in a square hole grid (such as square hole grid 600 shown in FIG. 7A), a hexagonal hole grid (such as hexagonal hole grid 602 shown in FIG. 7B), or other suitable repeating or non-repeating patterns.

The wire electrode can form uniform holes 302 in metal sheet 300 through electrical discharge machining (EDM). The EDM process removes material from metal sheet 300 through a rapid series of electrical discharges generated between the wire electrode and the metal sheet (which serves as the other electrode in the system). The wire electrode can be a micro-EDM electrode and can have a constant diameter of between 0.001 inches and 0.25 inches. In some examples, the wire electrode can have a constant diameter of approximately 0.005 inches (approximately 0.127 millimeters). In step 202, holes 302 can have a width $W_0$ of approximately 0.005 inches. During step 202, metal sheet 300 and the wire electrode do not come into direct contact with each other and can be separated by a dielectric liquid.

In step 204, first end 304 of each hole 302 is shaped by a flow of an abrasive flow medium as shown in FIG. 4C. The abrasive flow medium can flow in first direction $D_1$ relative to metal sheet 300. The abrasive flow medium can shape the first end 304 of each hole 302 through abrasive flow machining (AFM). The AFM process removes material from metal sheet 300 through the use of an abrasive material, such as diamond powder, within the abrasive flow medium. The abrasive flow medium can include a low-viscosity liquid which contains the abrasive. The abrasive flow medium can be directed hydraulically or mechanically through holes 302 in the first direction at a range of angles in order to achieve a tapered shape of each hole 302 at first end 304. The resulting curvature of the portions of wall sections 308 adjacent to first ends 304 can be convex relative to the corresponding hole 302. After performing step 204, each first end 304 can have a width $W_1$ of approximately 0.009 inches.

In step 206, second end 306 of each hole 302 is shaped by a flow of the abrasive flow medium as shown in FIG. 4D. The abrasive flow medium can flow in second direction D2 to shape second ends 306. Second direction D2 can be opposite first direction $D_1$ relative to metal sheet 300. The abrasive flow medium can be directed through holes 302 in the second direction at a range of angles in order to achieve a tapered shape of each hole 302 between second end 306 and narrowest point 310. The resulting curvature of the portions of wall sections 308 adjacent to second ends 306 can be convex relative to the corresponding hole 302, and can be greater or lesser than the curvature of the portions of wall sections 308 adjacent to first ends 304 depending on the desired dimensions of holes 302. After performing step 206, each second end 306 can have a width $W_2$ of approximately 0.009 inches.

Performing steps 202-206 results in airfoil-shaped wall sections (such as first members 108 and second members 110, shown in FIGS. 2A-2B) and a tapered shape of each hole 302, with both the first ends 304 and the second ends 306 having a diameter ($W_1$, $W_2$) of approximately 0.009 inches (approximately 0.229 millimeters) and narrowest point 310 of each hole 302 having a diameter ($W_0$) of approximately 0.005 inches. Method 200 is a bulk process which allows all first ends 304 or second ends 306 to be shaped uniformly and simultaneously.

Figure 5:
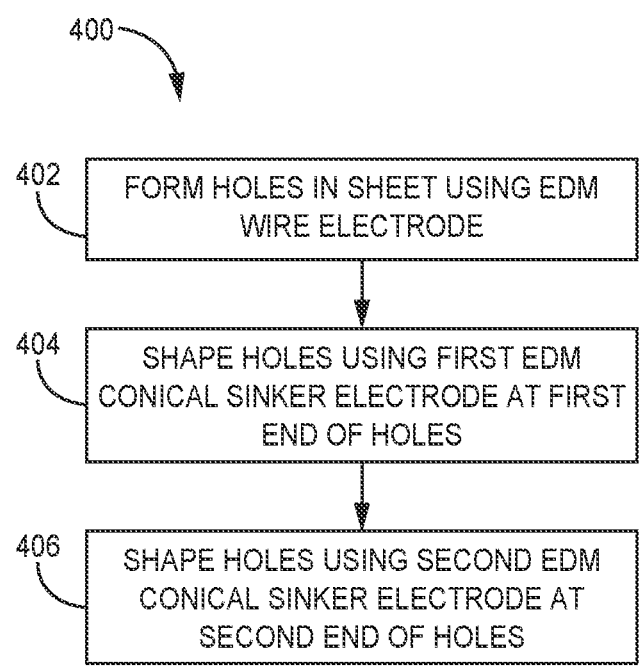
FIG. 5 depicts a method of creating airfoil-shaped holes in a last chance screen using shaped EDM electrodes.
Figure 6A:
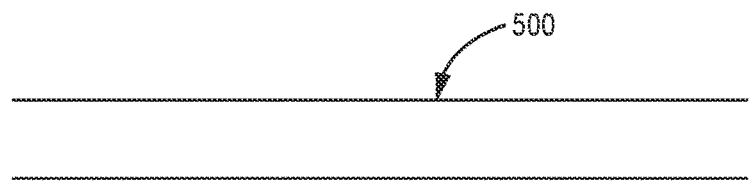
FIG. 6A is a cross-sectional side view of a metal sheet.
Figure 6B:
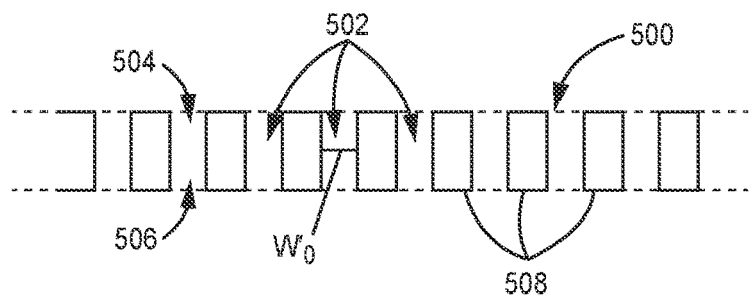
FIG. 6B is a cross-sectional side view of the metal sheet of FIG. 6A after holes have been formed in the sheet by a wire electrode using EDM.
Figure 6C:
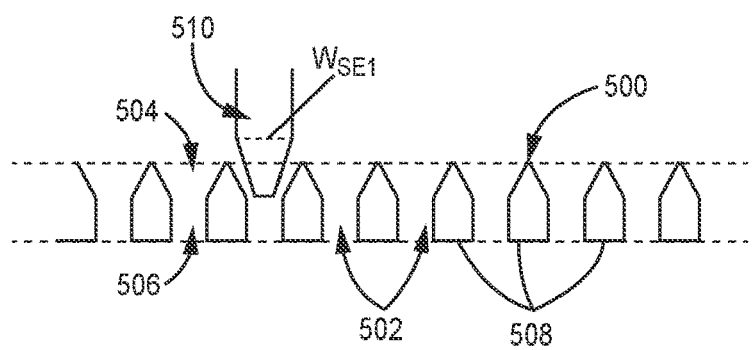
FIG. 6C is a cross-sectional side view of the metal sheet of FIG. 6B after a first end of each hole has been shaped by a first conical sinker electrode using EDM.
Figure 6D:
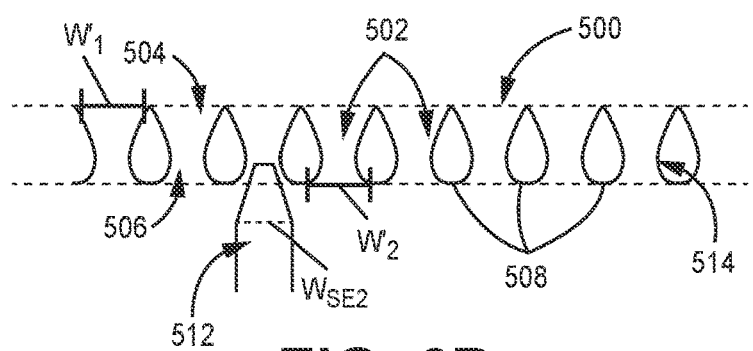
FIG. 6D is a cross-sectional side view of the metal sheet of FIG. 6C after a second end of each hole has been shaped by a second conical sinker electrode using EDM.

FIG. 5 depicts method 400 of creating holes (such as holes 502 shown in FIGS. 6B-6D) in a last chance screen using shaped EDM electrodes. Method 400 includes steps 402-406. FIG. 6A is a cross-sectional side view of metal sheet 500. FIG. 6B is a cross-sectional side view of metal sheet 500 after holes 502 have been formed in metal sheet 500 by a wire electrode using EDM. Each hole 502 extends from first end 504 to second end 506 and is surrounded by wall sections 508. FIG. 6C is a cross-sectional side view of metal sheet 500 after first end 504 of each hole 502 has been shaped by first conical sinker electrode 510 using EDM. FIG. 6D is a cross-sectional side view of metal sheet 500 after a second end of each hole 502 has been shaped by second conical sinker electrode 512 using EDM. FIG. 5 will be discussed with each of FIGS. 6A-6D in turn below.

FIG. 6A is a cross-sectional side view, pre-machining, of metal sheet 500. Metal sheet 500 can be of the same or a similar thickness as metal sheet 300 (shown in FIGS. 4A-4D) and can be formed of the same material.

In step 402, holes 502 are formed in metal sheet 500 as shown in FIG. 6B using EDM. A wire electrode can be used to form uniform through-holes in metal sheet 500 in a selected pattern in the same manner, and of the same dimensions, as described above in reference to FIGS. 3 and 4B. In step 402, holes 502 can have a width $W'_0$ of approximately 0.005 inches.

In step 404, first ends 504 of holes 502 are shaped with first conical sinker electrode 510 using EDM. First conical sinker electrode 510 differs from the wire electrode used in step 402 in that first conical sinker electrode 510 does not create a through-hole in metal sheet 500. First conical sinker electrode 510 can have a conical end and can have a diameter $W_{SE1}$ of between approximately 0.001 inches and approximately 0.25 inches. In some examples, first conical sinker electrode 510 can be shaped and operated to create a width $W'_1$ of first end 504 that is approximately 0.009 inches, thereby widening first end 504 by approximately 0.004 inches. The resulting curvature of the portions of wall sections 508 adjacent to first ends 504 can be convex relative to the corresponding hole 502.

In step 406, second ends 506 of holes 502 are shaped with second conical sinker electrode 512 using EDM. Second conical sinker electrode 512 can have a similar shape and similar dimensions (having a diameter $W_{SE2}$ of between approximately 0.001 inches and approximately 0.25 inches) as first conical sinker electrode 510 and can operate in the same manner as first conical sinker electrode 510. In some examples, second conical sinker electrode 512 can be shaped and operated to create a width $W'_2$ of second end 506 that is approximately 0.009 inches, thereby widening second end 506 by approximately 0.004 inches. The resulting curvature of the portions of wall sections 508 adjacent to second ends 506 can be convex relative to the corresponding hole 502, and can be greater or lesser than the curvature of the portions of wall sections 508 adjacent to first ends 504 depending on the desired dimensions of holes 502.

Performing steps 402-406 results in airfoil-shaped wall sections (such as first members 108 and second members 110, shown in FIGS. 2A-2B) and a tapered shape of each hole 502, with both the first ends 504 and the second ends 506 having a diameter ($W'_1$, $W'_2$) of approximately 0.009 inches and a narrowest point 514 of each hole 502 having a diameter ($W'_0$) of approximately 0.005 inches. Method 400 can be used to shape each end of holes 502 individually, or can be used as a bulk process with an array of sinker electrodes to shape all of holes 502 simultaneously (that is, to shape all first ends 504 at once and then to shape all second ends 506 at once).

Figure 7B:
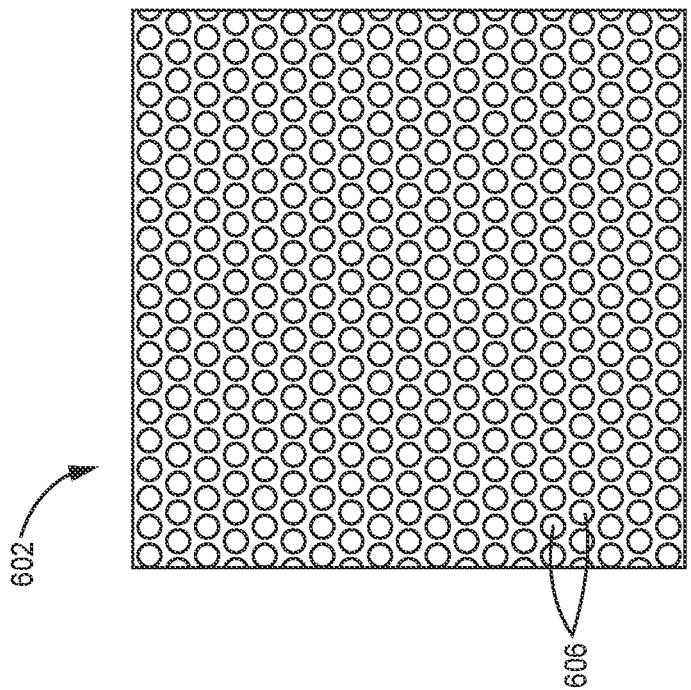
FIG. 7B is a top plan view of a last chance screen with a hexagonal hole grid.
Figure 7A:
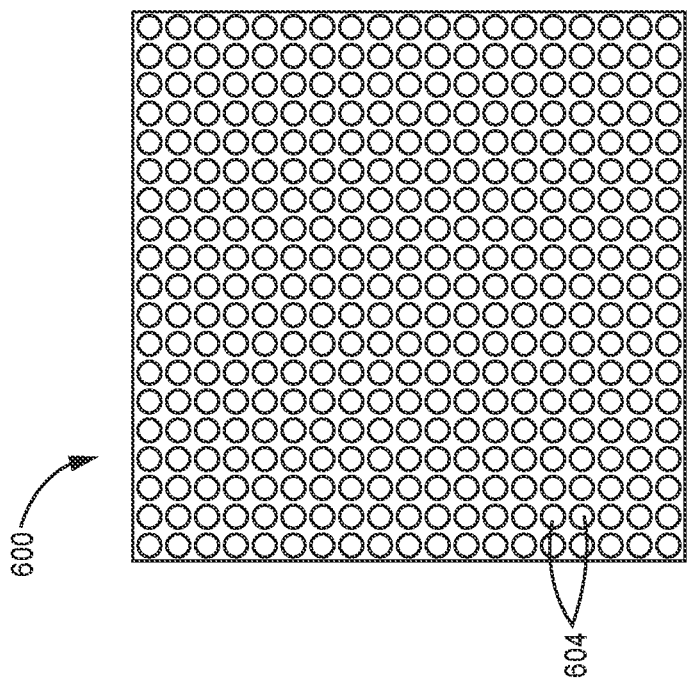
FIG. 7A is a top plan view of a last chance screen with a square hole grid.

FIG. 7A is a top plan view of square hole grid 600 within a last chance screen (such as last chance screen 100 shown in FIG. 2A). FIG. 7B is a top plan view of hexagonal hole grid 602 within a last chance screen (such as last chance screen 100 shown in FIG. 2A). FIGS. 7A-7B will be discussed concurrently below. Square hole grid 600 includes holes 604 such that square hole grid 600 forms an array of holes 604. Hexagonal hole grid 602 includes holes 606 such that hexagonal hole grid 602 forms an array of holes 606.

Method 200 and/or method 400 can be used to create arrays of shaped holes within a last chance screen (such as last chance screen 100 shown in FIG. 2A) in a desired pattern. For example, during step 202 and/or step 402, the wire electrode can be used to form an array of holes 604 within the metal sheet (such as metal sheets 300, 500 shown in FIGS. 4A and 6A respectively) in a pattern that forms square hole grid 600. Holes 604 are arranged within square hole grid 600 such that each hole 604 in a particular row and column is aligned with the hole(s) 604 immediately preceding and/or succeeding it in that row and column. Each hole 604 is thereby surrounded by a square of holes 604. Alternatively, during step 202 and/or step 402, the wire electrode can be used to form an array of holes 606 within the sheet in a pattern that forms hexagonal hole grid 602. Holes 606 are arranged within hexagonal hole grid 602 such that every other row and column of holes 602 is aligned, and each hole within a particular row and column are centered between the holes of the immediately preceding and/or succeeding row and column. Each hole 606 is thereby surrounded by a hexagon of holes 606.

A method of manufacturing a last chance screen as described above provides numerous advantages. The use of an AFM process allows the entire array of holes to be shaped simultaneously by applying the abrasive flow medium to one side of the sheet. AFM also produces a consistent hole size across the screen without the risk of burrs or other flaws in the screen. Similarly, the use of a conical sinker electrode provides consistent and reliable shaping of the holes in the screen. Finally, machining processes such as EDM and AFM do not require direct contact between a machining tool and the metal sheet, preventing damage or inconsistencies due to tool pressure.

Discussion of Possible Embodiments

The following are non-exclusive descriptions of possible embodiments of the present invention.

A method of manufacturing a last chance screen for an aircraft engine includes forming an array of holes through a metal sheet with a wire electrode using electrical discharge machining. The array of holes comprises a plurality of holes. Each hole of the plurality of holes extends from a first end to a second end. Each hole is surrounded by a wall section such that the last chance screen is defined by the plurality of holes and the plurality of wall sections. The first end of each hole is shaped by applying a flow of an abrasive flow medium to the array of holes in a first direction, such that the first end of each hole is widened by the flow of the abrasive flow medium and a portion of the wall section adjacent to the first end of each hole has a first convex curvature with respect to the hole. The second end of each hole is shaped by applying a flow of the abrasive flow medium to the array of holes in a second direction which is opposite to the first direction, such that the second end of each hole is widened by the flow of the abrasive flow medium and a portion of the wall section adjacent to the second end of each hole has a second convex curvature with respect to the hole. Shaping the first end of each hole and shaping the second end of each hole results in an airfoil-shaped cross-section of each wall section.

The method of the preceding paragraph can optionally include, additionally and/or alternatively, any one or more of the following features, configurations and/or additional components:

A method of manufacturing a last chance screen for an aircraft engine according to an exemplary embodiment of the present invention, among other possible things, includes forming an array of holes through a metal sheet with a wire electrode using electrical discharge machining. The array of holes comprises a plurality of holes. Each hole of the plurality of holes extends from a first end to a second end. Each hole is surrounded by a wall section such that the last chance screen is defined by the plurality of holes and the plurality of wall sections. The first end of each hole is shaped by applying a flow of an abrasive flow medium to the array of holes in a first direction, such that the first end of each hole is widened by the flow of the abrasive flow medium and a portion of the wall section adjacent to the first end of each hole has a first convex curvature with respect to the hole.

The second end of each hole is shaped by applying a flow of the abrasive flow medium to the array of holes in a second direction which is opposite to the first direction, such that the second end of each hole is widened by the flow of the abrasive flow medium and a portion of the wall section adjacent to the second end of each hole has a second convex curvature with respect to the hole. Shaping the first end of each hole and shaping the second end of each hole results in an airfoil-shaped cross-section of each wall section.

A further embodiment of the foregoing method, wherein the metal sheet is formed of a stainless steel alloy.

A further embodiment of any of the foregoing methods, wherein the stainless steel alloy is selected from the group comprising: grade 304 stainless steel and grade 316L stainless steel.

A further embodiment of any of the foregoing methods, wherein the metal sheet is formed of an Inconel® alloy.

A further embodiment of any of the foregoing methods, wherein each wall section has a diameter of approximately 0.004 inches at a widest point of the wall section.

A further embodiment of any of the foregoing methods, wherein each hole has a diameter of approximately 0.005 inches at a narrowest point of the hole.

A further embodiment of any of the foregoing methods, wherein the plurality of holes are arranged in the metal sheet such that the array of holes forms a square grid.

A further embodiment of any of the foregoing methods, wherein the plurality of holes are arranged in the metal sheet such that the array of holes forms a hexagonal grid.

A further embodiment of any of the foregoing methods, wherein the first convex curvature is greater than the second convex curvature.

A further embodiment of any of the foregoing methods, wherein the second convex curvature is greater than the first convex curvature.

A further embodiment of any of the foregoing methods, wherein the abrasive flow medium comprises a low-viscosity liquid and a diamond powder abrasive.

A further embodiment of any of the foregoing methods, wherein the plurality of wall sections comprises a plurality of first members extending in a first direction and a plurality of second members extending in a second direction such that each second member of the plurality of second members intersects at least one first member of the plurality of second members. Each hole is surrounded by two first members and two second members. Each hole forms a square opening at the first end and the second end. Each first member and each second member have an airfoil-shaped cross-section.

A method of manufacturing a last chance screen for an aircraft engine includes forming an array of holes through a metal sheet with a wire electrode using electrical discharge machining. The array of holes comprises a plurality of holes. Each hole of the plurality of holes extends from a first end to a second end. Each hole is surrounded by a wall section such that the last chance screen is defined by the plurality of holes and the plurality of wall sections. The first end of each hole is shaped with a first conical sinker electrode using electrical discharge machining, such that the first end of each hole is widened by the electrical discharge machining and a portion of the wall section adjacent to the first end of each hole has a first convex curvature with respect to the hole. The second end of each hole is shaped with a second conical sinker electrode using electrical discharge machining, such that the second end of each hole is widened by the electrical discharge machining and a portion of the wall section adjacent to the second end of each hole has a second convex curvature with respect to the hole. Shaping the first end of each hole and shaping the second end of each hole results in an airfoil-shaped cross-section of each wall section.

The method of the preceding paragraph can optionally include, additionally and/or alternatively, any one or more of the following features, configurations and/or additional components:

A method of manufacturing a last chance screen for an aircraft engine according to an exemplary embodiment of the present invention, among other possible things, includes forming an array of holes through a metal sheet with a wire electrode using electrical discharge machining. The array of holes comprises a plurality of holes. Each hole of the plurality of holes extends from a first end to a second end. Each hole is surrounded by a wall section such that the last chance screen is defined by the plurality of holes and the plurality of wall sections. The first end of each hole is shaped with a first conical sinker electrode using electrical discharge machining, such that the first end of each hole is widened by the electrical discharge machining and a portion of the wall section adjacent to the first end of each hole has a first convex curvature with respect to the hole. The second end of each hole is shaped with a second conical sinker electrode using electrical discharge machining, such that the second end of each hole is widened by the electrical discharge machining and a portion of the wall section adjacent to the second end of each hole has a second convex curvature with respect to the hole. Shaping the first end of each hole and shaping the second end of each hole results in an airfoil-shaped cross-section of each wall section.

A further embodiment of the foregoing method, wherein the wire electrode has a constant diameter between 0.001 inches to 0.25 inches.

A further embodiment of any of the foregoing methods, wherein the wire electrode has a constant diameter of 0.005 inches.

A further embodiment of any of the foregoing methods, wherein the first conical sinker electrode and the second conical sinker electrode each have a diameter of between 0.001 inches to 0.25 inches.

A further embodiment of any of the foregoing methods, wherein the first conical sinker electrode widens the first end of each hole by 0.004 inches.

A further embodiment of any of the foregoing methods, wherein the second conical sinker electrode widens the second end of each hole by 0.004 inches.

A further embodiment of any of the foregoing methods, wherein a half-cone angle between an end of each wall section and a widest point of each wall section is between 1 degrees to 30 degrees.

A further embodiment of any of the foregoing methods, wherein the half-cone angle is 5 degrees.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of manufacturing a last chance screen for an aircraft engine, the method comprising:

forming an array of holes through a metal sheet with a wire electrode using electrical discharge machining, wherein:
   the array of holes comprises a plurality of holes;
   each hole of the plurality of holes extends from a first end to a second end; and
   each hole is surrounded by one or more wall sections such that the last chance screen is defined by the plurality of holes and the plurality of wall sections;
shaping the first end of each hole by applying a flow of an abrasive flow medium to the array of holes in a first direction, such that the first end of each hole is widened by the flow of the abrasive flow medium and a portion of the wall section adjacent to the first end of each hole has a first convex curvature with respect to the hole; and
shaping the second end of each hole by applying a flow of the abrasive flow medium to the array of holes in a second direction which is opposite to the first direction, such that the second end of each hole is widened by the flow of the abrasive flow medium and a portion of the wall section adjacent to the second end of each hole has a second convex curvature with respect to the hole;
wherein shaping the first end of each hole and shaping the second end of each hole results in an airfoil-shaped cross-section of each wall section.

2. The method of claim 1, wherein the metal sheet is formed of a stainless steel alloy.

3. The method of claim 2, wherein the stainless steel alloy is selected from the group comprising: grade 304 stainless steel and grade 316L stainless steel.

4. The method of claim 1, wherein the metal sheet is formed of an Inconel® alloy.

5. The method of claim 1, wherein each wall section has a diameter of approximately 0.004 inches at a widest point of the wall section.

6. The method of claim 1, wherein each hole has a diameter of approximately 0.005 inches at a narrowest point of the hole.

7. The method of claim 1, wherein the plurality of holes are arranged in the metal sheet such that the array of holes forms a square grid.

8. The method of claim 1, wherein the plurality of holes are arranged in the metal sheet such that the array of holes forms a hexagonal grid.

9. The method of claim 1, wherein the first convex curvature is greater than the second convex curvature.

10. The method of claim 1, wherein the second convex curvature is greater than the first convex curvature.

11. The method of claim 1, wherein the abrasive flow medium comprises a low-viscosity liquid and a diamond powder abrasive.

12. The method of claim 1, wherein the plurality of wall sections comprises:
   a plurality of first members extending in a first direction; and
   a plurality of second members extending in a second direction such that each second member of the plurality of second members intersects at least one first member of the plurality of second members;
wherein:
   each hole is surrounded by two first members and two second members;
   each hole forms a square opening at the first end and the second end; and
   each first member and each second member have an airfoil-shaped cross-section.

13. A method of manufacturing a last chance screen for an aircraft engine, the method comprising:
forming an array of holes through a metal sheet with a wire electrode using electrical discharge machining, wherein:
   the array of holes comprises a plurality of holes;
   each hole of the plurality of holes extends from a first end to a second end; and
   each hole is surrounded by a wall section such that the last chance screen is defined by the plurality of holes and the plurality of wall sections;
shaping the first end of each hole with a first conical sinker electrode using electrical discharge machining, such that the first end of each hole is widened by the electrical discharge machining and a portion of the wall section adjacent to the first end of each hole has a first convex curvature with respect to the hole; and
shaping the second end of each hole with a second conical sinker electrode using electrical discharge machining, such that the second end of each hole is widened by the electrical discharge machining and a portion of the wall section adjacent to the second end of each hole has a second convex curvature with respect to the hole;
wherein shaping the first end of each hole and shaping the second end of each hole results in an airfoil-shaped cross-section of each wall section.

14. The method of claim 13, wherein the wire electrode has a constant diameter between 0.001 inches to 0.25 inches.

15. The method of claim 14, wherein the wire electrode has a constant diameter of 0.005 inches.

16. The method of claim 13, wherein the first conical sinker electrode and the second conical sinker electrode each have a diameter of between 0.001 inches to 0.25 inches.

17. The method of claim 16, wherein the first conical sinker electrode widens the first end of each hole by 0.004 inches.

18. The method of claim 16, wherein the second conical sinker electrode widens the second end of each hole by 0.004 inches.

19. The method of claim 13, wherein a half-cone angle between an end of each wall section and a widest point of each wall section is between 1 degrees to 30 degrees.

20. The method of claim 19, wherein the half-cone angle is 5 degrees.

* * * * *